US011764612B2

(12) United States Patent
Czainski (10) Patent No.: US 11,764,612 B2
(45) Date of Patent: Sep. 19, 2023

(54) ANTENNA ARRANGEMENT AND A METHOD OF OPERATING AN ANTENNA ARRANGEMENT

(71) Applicant: Bombardier Primove GmbH, Berlin (DE)

(72) Inventor: Robert Czainski, Zelona Góra (PL)

(73) Assignee: Bombardier Primove GmbH, Berlin (DE)

( * ) Notice: Subject to any disclaimer, the term of this patent is extended or adjusted under 35 U.S.C. 154(b) by 0 days.

(21) Appl. No.: 17/312,852

(22) PCT Filed: Dec. 19, 2019

(86) PCT No.: PCT/EP2019/086295
§ 371 (c)(1),
(2) Date: Jun. 10, 2021

(87) PCT Pub. No.: WO2020/127725
PCT Pub. Date: Jun. 25, 2020

(65) Prior Publication Data
US 2022/0045550 A1 Feb. 10, 2022

(30) Foreign Application Priority Data
Dec. 21, 2018 (GB) ..................................... 1821022

(51) Int. Cl.
*H02J 50/12* (2016.01)
*H02J 50/90* (2016.01)
(Continued)

(52) U.S. Cl.
CPC .............. *H02J 50/12* (2016.02); *B60L 53/12* (2019.02); *B60L 53/36* (2019.02); *H02J 50/90* (2016.02)

(58) Field of Classification Search
CPC . H02J 50/12; H02J 50/90; B60L 53/12; B60L 53/36
See application file for complete search history.

(56) References Cited

U.S. PATENT DOCUMENTS 7,394,368 B2 *  7/2008 Richards ................. E05F 15/00
                                                                 340/562
7,454,170 B2    11/2008 Goossens et al.
(Continued)

FOREIGN PATENT DOCUMENTS

EP        0579332 A1    1/1994
EP        1041503 A1    10/2000
(Continued)

OTHER PUBLICATIONS

International Search Report and Written Opinion dated Mar. 5, 2020, in connection with PCT/EP2019/086295 filed Dec. 19, 2019.

*Primary Examiner* — Daniel Kessie
*Assistant Examiner* — Brian K Baxter
(74) *Attorney, Agent, or Firm* — Downs Rachlin Martin PLLC (57) ABSTRACT

The invention relates to an antenna arrangement, wherein the antenna arrangement comprises a voltage source, a first inductive antenna element, a second inductive antenna element and at least one capacitive element, wherein the voltage source is electrically connected in parallel to a series connection of a first circuit section comprising at least the first inductive antenna element and a further circuit section comprising a parallel connection of a first subsection of the further circuit section comprising the at least one capacitive element and a further subsection of the further circuit section comprising at least the second inductive antenna element, and a method of operating an antenna arrangement.

18 Claims, 2 Drawing Sheets

(51) Int. Cl.
  *B60L 53/12* (2019.01)
  *B60L 53/36* (2019.01)

(56) References Cited

U.S. PATENT DOCUMENTS

| | | | | |
|---|---|---|---|---|
| 7,512,383 | B2* | 3/2009 | Essabar | H04B 5/0075 |
| | | | | 455/197.3 |
| 10,110,140 | B1* | 10/2018 | Nanut | H02M 5/44 |
| 10,992,158 | B2* | 4/2021 | Glover | H02J 50/20 |
| 11,070,083 | B2* | 7/2021 | Klingspor | H02J 50/12 |
| 2007/0120739 | A1 | 5/2007 | Johanessen et al. | |
| 2009/0284253 | A1* | 11/2009 | Finkler | G01D 5/2046 |
| | | | | 324/207.2 |
| 2013/0039099 | A1* | 2/2013 | Wu | H02J 50/12 |
| | | | | 363/40 |
| 2014/0361628 | A1* | 12/2014 | Huang | H01F 38/14 |
| | | | | 307/104 |
| 2015/0202970 | A1 | 7/2015 | Huang et al. | |
| 2015/0207335 | A1* | 7/2015 | Madawala | H02J 50/40 |
| | | | | 307/104 |
| 2016/0137072 | A1* | 5/2016 | Lee | B60L 53/12 |
| | | | | 320/108 |
| 2018/0205260 | A1* | 7/2018 | Maniktala | H01F 27/2895 |
| 2018/0233961 | A1* | 8/2018 | Hu | H02J 7/025 |
| 2018/0309323 | A1* | 10/2018 | Klingspor | H02J 50/402 |
| 2019/0058362 | A1* | 2/2019 | Klingspor | B60L 53/126 |
| 2019/0074724 | A1* | 3/2019 | Wittenberg | H04B 5/0037 |
| 2019/0074729 | A1* | 3/2019 | Wittenberg | H02J 50/80 |
| 2020/0067341 | A1* | 2/2020 | Glover | H02J 50/80 |
| 2020/0083857 | A1* | 3/2020 | Testi | H03H 7/09 |
| 2021/0226473 | A1* | 7/2021 | Mao | H02J 3/18 |

FOREIGN PATENT DOCUMENTS

| | | |
|---|---|---|
| JP | 2007266892 A | 10/2007 |
| WO | 2011127455 A2 | 10/2011 |
| WO | 2014023595 A2 | 2/2014 |
| WO | 2017042364 A1 | 3/2017 |
| WO | 2017064326 A1 | 4/2017 |

* cited by examiner

ANTENNA ARRANGEMENT AND A METHOD OF OPERATING AN ANTENNA ARRANGEMENT

FIELD OF THE DISCLOSURE

The invention relates to an antenna arrangement, in particular in antenna arrangement for generating signals for positioning purposes, more particular for performing a positioning of a vehicle-sided secondary winding structure relative to a primary winding structure of the system for inductive power transfer to a vehicle.

BACKGROUND

Electric vehicles, in particular a track-bound vehicle, and/or a road automobile, can be operated by electric energy which is transferred by means of an inductive power transfer. Such a vehicle may comprise a so-called receiving device adapted to receive an alternating electromagnetic field and to produce an alternating electric current by electromagnetic induction. Such a receiving device can comprise or provide a so-called secondary winding structure. Furthermore, such a vehicle can comprise a rectifier adapted to convert an alternating current (AC) to a direct current (DC). The DC can be used to charge a traction battery or to operate an electric machine. The rectifier converts the AC provided by the receiving device into the DC.

The inductive power transfer is usually performed using a primary unit which generates the alternating electromagnetic field by a primary winding structure and a secondary unit which comprises the receiving device for receiving said electromagnetic field. The primary unit and the secondary unit can e.g. each comprise a set of three-phase windings providing the aforementioned primary and secondary winding structure. A set of windings of the primary unit can be installed on the ground (primary winding structure) and can be fed by a wayside power converter (WPC). A set of windings (secondary winding structure) of the secondary unit is installed on the vehicle. For example, the second set of windings can be attached underneath the vehicle, in the case of trams under some of its wagons. The set of windings of the primary unit can also be referred to as primary side, wherein the set of windings of the secondary unit can be referred to as secondary side. The first and the secondary side can be part of a high frequency transformer to transfer electric energy to the vehicle. This transfer can be done in a static state (when there is no movement of the vehicle) and in a dynamic state (when the vehicle moves).

Inductive power transfer usually requires a correct positioning of a vehicle-sided secondary winding structure relative to a primary winding structure in order to maximize the amount of transfer power but also in order to meet safety requirements and ensure an electromagnetic compatibility.

A relative position can e.g. be determined depending on the relative position between an antenna arrangement which generates a positioning signal and a receiving antenna arrangement which receives the positioning signal, wherein the relative position between the arrangements is determined depending on a signal characteristic of the received positioning signal. In this case, the antenna arrangement which generates a positioning signal can be a primary-sided antenna arrangement and the receiving antenna arrangement can be a secondary-sided antenna arrangement or vice versa.

WO2017/064326 A1 discloses an inductive power transfer unit, wherein the inductive power transfer unit comprises at least one winding structure or at least one flux guiding means, wherein the inductive power transfer unit further comprises at least one antenna element, wherein at least one portion of the at least one flux guiding means is a part of the antenna element.

Document WO2017/042364 A1 discloses a system for determining a relative position and/or orientation between a primary winding structure and a secondary winding structure of a system for inductive power transfer.

U.S. Pat. No. 7,454,170 B2 discloses an inductive transmission system for inductive transmission of power and full duplex data signals between first and second devices. The transmission system includes a bi-directional inductive channel between the two devices, a transmitter for transmitting a power signal at a first frequency from the first device to the second device over the inductive channel, a first modulating device for modulating a first data signal at a first modulation frequency, and a second modulating device for modulating a second data signal at a second modulation frequency. Further, the transmitters transmit the modulated first data signals from the first device to the second device over the inductive channel and transmit the modulated second data signals from the second device to the first device over the inductive channel. The first modulation frequency and the second modulation frequency are at least a factor two apart.

WO 2011/127455 A2 describes a wireless charging and wireless power alignment of wireless power antennas associated with a vehicle.

WO 2014/023595 A2 discloses a vehicle and an induction charging unit, wherein the induction charging unit comprises a primary coil and the vehicle comprises a secondary coil. Further, in the charging position, the secondary coil is located in a preferred spatial position range with respect to the primary coil with the result that, in order to set the charging position, the system determines, by means of an electromagnetic distance and angle measurement using triangulation, a location which describes a time-dependent spatial position of the secondary coil with respect to the primary coil. The system detects, by means of the location and the charging position, at least one partial driving direction along which the location of a charging position can be approached.

SUMMARY OF THE DISCLOSURE

There is the technical problem of providing an antenna arrangement and a method of operating an antenna arrangement which allows a reliable and accurate generation of a positioning signal with predetermined, desired characteristics and which requires only a small number of elements.

The solution to said technical problem is provided by the subject-matter with the features of the claims 1 and 14. Further advantages embodiments are provided by the subject-matter with the features of the sub claims.

Proposed is an antenna arrangement, in particular for generating positioning signals. The positioning signals can be used to perform a method for determining a relative position and/or orientation between a unit comprising the antenna arrangement and a positioning signal receiving unit. These units can e.g. be units, in particular a secondary and a primary unit, of a system for inductive power transfer, in particular to a vehicle. In this case, the antenna arrangement can be a primary-sided antenna arrangement, wherein a positioning signal receiving arrangement is a secondary-sided arrangement.

Alternatively, the antenna arrangement can be a secondary-sided arrangement wherein a positioning signal receiving arrangement is a primary-sided arrangement. A relative position and/or orientation between the antenna arrangement for generating positioning signals and said positioning signal receiving arrangement can e.g. be determined depending on the positioning signals received by the receiving arrangement, in particular depending on signal characteristics of said received positioning signals. A signal characteristic can e.g. be spectral power of the positioning signal. The relative position can e.g. be determined within the secondary-sided coordinate system or within a primary-sided coordinate system.

The relative position and/or orientation can e.g. be determined by a secondary-sided control unit or by a primary-sided control unit. A control unit can e.g. comprises one or more micro controller(s).

The antenna arrangement comprises a voltage source, in particular for generating an AC (alternating current) voltage. The AC voltage can have predetermined characteristics, in particular a predetermined frequency. The voltage source, in particular at least one characteristic of the AC voltage, can be controlled by a control unit which can e.g. be also part of the antenna arrangement. The control unit can be provided by at least one microcontroller and/or at least one integrated circuit.

Further, the antenna arrangement comprises a first inductive antenna element and a second inductive antenna element. And inductive antenna element can e.g. be provided by an antenna winding or antenna coil. An inductive antenna element is an element for generating an electromagnetic field which provides the positioning signal. By means of the first inductive antenna element, a first positioning signal can be generated. By means of the second inductive antenna element, a second positioning signal can be generated.

Further, the antenna arrangement comprises at least one capacitive element, in particular a capacitor.

Further, the voltage source is electrically connected in parallel to a series connection of a first circuit section and a further circuit section. The first circuit section comprises at least the first antenna element. The further circuit section comprises a parallel connection of a first subsection of the further circuit section and a further subsection of the further circuit section. The first subsection comprises the at least one capacitive element and the further subsection comprises at least the second antenna element.

The voltage source can also be referred to as driving source which drives the electric circuit provided by the series connection of the first and the further circuit section. If an AC voltage is applied to said circuit, the inductive antenna elements generate an electromagnetic field. Voltages falling across the terminals of the two antenna elements will have a predetermine phase shift, in particular a phase shift of 90°. This results in the generation of positioning signals with said predetermined phase shift.

Generating two positioning signals with a predetermined phase shift advantageously allows a robust and accurate determination of the relative position and/or orientation between the antenna arrangement generating the positioning signals and a receiving arrangement which receives the positioning signals. In particular, the predetermined phase shift information can be used to determine the relative position and/or orientation.

Further, the proposed antenna arrangement advantageously allows the generation of positioning signals, e.g. an electromagnetic field, with significant portions oriented in different, in particular two, three or more than three spatial directions, wherein the spatial directions can be oriented perpendicular to one another. More particular, the antenna arrangement advantageously allows the generation of a circular or elliptical electromagnetic field (if a change in time of the direction of the electromagnetic field is considered). This simplifies the aforementioned robust and accurate determination of the relative position and/or orientation.

In other words, a two-dimensional (2D) antenna arrangement which allows to accurately generate positioning signals with a predetermined phase shift with a small number of elements, in particular only a single voltage source, is provided.

A frequency of the driving AC voltage can be equal to a predetermined resonant frequency or such that it does not deviate more than a predetermined amount from said predetermined resonant frequency. The predetermined resonant frequency can e.g. be a resonant frequency of the circuit provided by the series connection of the first circuit section and the further circuit section. This advantageously allows to generate positioning signals with a reduced amount of reactive power, i.e. an active generation of positioning signals.

In another embodiment, a reactance of the first circuit section is equal to the reactance of the first subsection of the further circuit section. In addition or alternatively, a reactance of the first circuit section is equal to the reactance of the further subsection of the further circuit section. It is also possible that in addition or alternatively, the reactance of the first subsection of the further circuit section and the reactance of the further subsection of the further circuit section are equal.

In particular, it is possible that an absolute value of the reactance of the first circuit section is equal to an absolute value of the reactance of the first subsection of the further circuit section and/or equal to an absolute value of the reactance of the further subsection of the further circuit section.

This equality can e.g. be provided at one or more predetermined frequency/frequencies, in particular at the driving frequency of the driving voltage. In this case, a current flowing through the second inductive antenna element is only proportional to driving voltage and inversely proportional to a reactance of the capacitive element but does not depend on a resistance in the first subsection, in particular a resistance of the second inductive antenna element or of an additional resistive element. This as a consequence, reduces the current level which is to be provided by the voltage source. The current is equal to $$I = U_d / X \qquad \text{(formula 1)}$$

Wherein I denotes the current flowing through the second inductive antenna element, Ud notes the driving voltage and X denotes the reactance of the further subsection of the further circuit section.

If the aforementioned equality of reactances or absolute values of reactances is provided, the current flowing through the first and the second antenna element will be phase-shifted by 90°. Thus, an elliptical, in particular is a circular, electromagnetic field can be provided by the antenna arrangement, in particular in the case the central axes of the first antenna element is oriented per perdiclar to central axes of the second antenna element.

In another embodiment, antenna arrangement comprises at least one resistive element, in particular a resistor. Further, the further subsection of the further circuit section comprises a series connection of at least the second antenna element and the at least one resistive element. The resistive element can be. different from the second antenna element.

Providing an additional resistive element advantageously allows to set a ratio between the current flowing through the first inductive antenna element and a current flowing through the second inductive antenna element or vice versa. Setting the ratio e.g. allows to set the signal strength or amplitude of different portions of the generated electromagnetic field, in particular portions which are oriented in different spatial directions. The ratio can e.g. be set to a value in the range of 0 (exclusively) to infinity (exclusively), in particular from 0.1 to 10.

In another embodiment, the antenna arrangement comprises at least one additional compensating capacitive element. The additional compensating element can be different from the capacitive element arranged in the first subsection of the further circuit section.

By means of the at least one additional compensating capacitive element, a resonant frequency of the antenna driving circuit can be adapted to e.g. characteristics of the voltage source. It is e.g. possible that only selected antenna elements with a limited range of characteristics are available/can be used. The compensating capacitive element can be chosen such that the resonant frequency of the driving circuit with said selected antenna elements is adapted, in particular equal to, the range of driving frequencies providable by the voltage source. This advantageously allows to operate the driving circuit in an energy efficient way.

In another embodiment, the first circuit section comprises a series connection of a compensating capacitive element and the first antenna element. Alternatively or in addition, the further subsection of the further circuit section comprises a series connection of a compensating capacitive element and the second antenna element. This advantageously allows a simply adjustment of resonant frequency of the driving circuit.

In another embodiment, the antenna arrangement comprises at least additional compensating inductive element. By means of the at least one additional compensating inductive element, an effect of external electromagnetic fields on the operation of the driving circuits can be reduced or eliminated. An external electromagnetic field can e.g. be the electromagnetic field for inductive power transfer which is generated by the primary winding structure. In particular, the external electromagnetic field is different from the electromagnetic fields providing positioning signals. It is possible that an external electromagnetic field induces a voltage in the additional compensating inductive element wherein this voltage is used to reduce a further induced voltage in the driving circuit due to the external electromagnetic field.

This advantageously increases a reliability and robustness of the generation of positioning signals.

Preferably, an additional compensating inductive element and an antenna element are designed and/or arranged such that there is no mutual coupling between the said inductive elements or such that the mutual coupling is smaller than a predetermined small threshold value. This can e.g. be achieved by arranging the least one additional compensating inductive element at a predetermined distance apart from the inductive antenna element. Other means of achieving a low mutual coupling, however, are possible.

This advantageously allows minimize an undesired weakening of the positioning signal by the compensating inductive element or signals generated by said compensating inductive element.

In another embodiment, the first circuit section comprises a series connection of a compensating inductive element and the first antenna element. Alternatively or in addition, the further subsection comprises a series connection of a compensating inductive element and the second antenna element. In this case, the first circuit section can comprise a series connection of the compensating inductive element, a compensating capacitive element and the first antenna element. Also, the further subsection can comprise a series connection of the compensating inductive element, a compensating capacitive element and/or a resistive element and the second antenna element. This advantageously allows a reliable and precise reduction of the effect of an external electromagnetic field.

In another embodiment, the antenna arrangement comprises at least two compensating inductive elements, wherein the at least two compensating inductive elements are provided by coils, wherein the coils are inversely wound, in particular with respect to one another. This can mean that the compensating inductive elements are configured and/or arranged within the driving circuit such that a voltage induced by the external electromagnetic field in the first compensating inductive element is counter-oriented to the voltage induced by the external electromagnetic field in the second compensating inductive element but has an equal absolute value and the voltages sum up to zero or approximately zero. This advantageously allows a simple but reliable and robust reduction of the effects of external electromagnetic fields on the driving circuit.

In another embodiment the antenna arrangement comprises at least one magnetically conductive element, wherein at least one antenna element is wound around at least one section of the magnetically conductive element. The magnetically conductive element can e.g. be a ferrite element, more particular a ferrite bar or ferrite rod. In this case, the at least one antenna element can be a ferrite rod antenna. This advantageously allows a generation of strong positioning signals and a compact design of the antenna arrangement.

In another embodiment, the first and the further antenna element are wound around different sections of the magnetically conductive element. In this case, the antenna arrangement can comprise a single magnetically conductive element, wherein the first and the further antenna element are wound around different sections of said single magnetically conductive element. This advantageously reduces the number of elements of the proposed antenna arrangement which, as a consequence, can lead to a cost effective manufacturing of the antenna arrangement and reduced building space requirements.

In an alternative embodiment, the antenna arrangement comprises a first and a further magnetically conductive element, wherein the first antenna element is wound around the first magnetically conductive element and the further antenna element is wound around the further magnetically conductive element. In this case the first and the further magnetically conductive element can be separate elements.

In another embodiment, the magnetically conductive element is a magnetically conductive element of a secondary unit of a system for inductive power transfer. The magnetically conductive element can be a flux guiding means for guiding a flux of the electromagnetic field for inductive power transfer. This advantageously allows to further reduce manufacturing costs and building space requirements since the magnetically conductive element for guiding the flux of the electromagnetic field for inductive power transfer is also used to guide the flux of the electromagnetic field providing the positioning signal.

In another embodiment, a central axis of the first antenna element and a central axis of the further antenna element are not oriented parallel. This means that an angle enclosed by the central axis can be chosen from a range of 0° (exclusive) to 180° (exclusive).

Preferably a central axis of the first antenna element and a central axis of the further antenna element can be orientated perpendicular to one another. In this case, central axes of the magnetically conductive elements or of sections of the magnetically conductive elements around which the first and the further antenna element are wound can also be not oriented parallel, in particular oriented perpendicular to one another.

This advantageously allows to robustly and reliably generate a 2D electromagnetic field for positioning purposes.

Further proposed is a method of operating an antenna arrangement according to one of the embodiments described in this disclosure. Within the method an alternating current (AC) voltage is generated by the voltage source. The AC voltage can have a predetermined frequency. In particular, the AC voltage which can also be referred to as driving voltage can be a sinusoidal or any other periodic voltage, e.g. a voltage with a rectangle or triangle shape.

The method advantageously allows to generate a positioning signal with desired characteristics, in particular a circular or elliptical positioning signal for a precise and robust determination of a relative position and/or orientation between the proposed antenna arrangement and a receiving arrangement for receiving the positioning signals.

In another embodiment, a frequency of the generated voltage (driving voltage) is equal to a resonant frequency of the series connection of the first circuit section and the further circuit section. This and corresponding advantages have been disclosed before.

Further described is a method for determining a relative position and/or orientation between the proposed antenna arrangement and a receiving arrangement for receiving the positioning signals generated by the proposed antenna arrangement. The antenna arrangement can be arranged fixed in position and/or orientation relative to a primary winding structure or to a secondary winding structure of a system for inductive power transfer wherein the receiving arrangement is arranged fixed in position and/or orientation relative to the remaining winding structure. In this case the method also allows to determine a relative position and/or orientation between the primary winding structure and the secondary winding structure of the system for inductive power transfer which is also described herein.

The receiving arrangement for receiving the positioning signals generated by the proposed antenna arrangement can have the same features as the proposed antenna arrangement for generating the positioning signals. In particular, it can be designed similar or identical to the proposed antenna arrangement for generating the positioning signals. Therefore, all features outlined in this disclosure with respect to the proposed antenna arrangement can be features of the receiving antenna arrangement. Further described is a position determining system which comprises the proposed antenna arrangement for generating the positioning signals and the said receiving arrangement. This system allows determining a relative position and/or orientation between the proposed antenna arrangement and a receiving arrangement for receiving the positioning signals generated by the proposed antenna arrangement. The system can further comprise a control unit which e.g. comprises a microcontroller or integrated circuit. The control unit can e.g. determine the relative position and/or orientation as a function of the output signal(s) of the receiving arrangement.

BRIEF DESCRIPTION OF THE DRAWINGS

The invention will be described with references to the attached figures.

The figures show.

DETAILED DESCRIPTION

In the following, the same references numerals denote the same or similar technical features.

Figure 1:
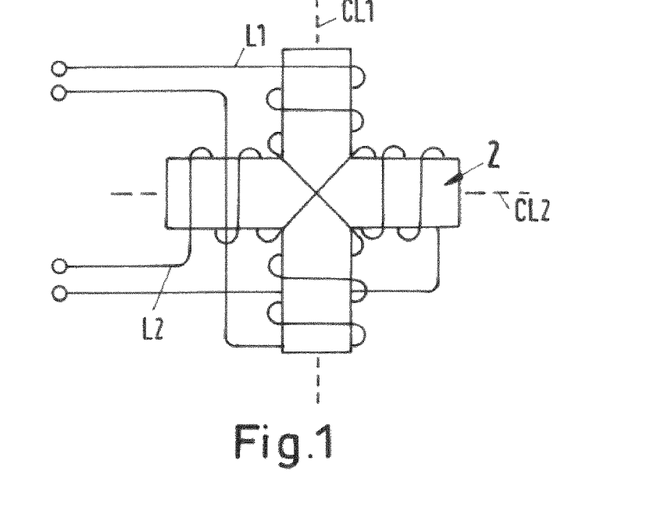
FIG. 1 a schematic view of a magnetically conductive element with two inductive antenna elements, FIG. 2 a schematic circuit diagram of an antenna arrangement according to a first embodiment to the invention, FIG. 3 a schematic circuit diagram of an antenna arrangement according to second embodiment of the invention, FIG. 4 a schematic circuit diagram of an antenna arrangement according to a third embodiment of the invention, FIG. 5 a schematic circuit diagram of an antenna arrangement according to a fourth embodiment of the invention, FIG. 6 a schematic block diagram of an antenna arrangement for generating positioning signals and of a receiving arrangement for receiving the positioning signals.

FIG. 1 shows a schematic diagram of a first inductive antenna element L1 and a second inductive antenna element L2. The first and the second inductive antenna elements L1, L2 are provided by winding structures, in particular coils. Further shown is a magnetically conductive element 2, in particular a ferrite element. The ferrite element 2 has a cross-like shape. The antenna elements L1, L2 are wound around different sections of the magnetically conductive element 2. In particular, the inductive antenna elements L1, L2 are arranged such that a central axis CL1 of the first inductive antenna element and a central axis CL2 of the second inductive antenna element L2 are oriented perpendicular to one another. Moreover, the sections of the magnetically conductive element 2, in particular their central axes, around which the respective inductive antenna element L1, L2 is wound are also oriented perpendicular to one another.

FIG. 1 shows an embodiment in which the different inductive antenna elements L1, L2 are wound around a single magnetically conductive element. It is, however, also possible to wind the inductive antenna elements L1, L2 around separate magnetically conductive elements.

The magnetically conductive element 2 can be the magnetically conductive element of a secondary unit with a secondary winding structure or a primary unit with a primary winding structure of a system for inductive power transfer, in particular to a vehicle. In such a secondary or primary unit, the magnetically conductive element can be used to guide the flux of the electromagnetic field for inductive power transfer, in particular the electromagnetic field generated by the primary winding structure or received by the secondary winding structure.

Figure 2:
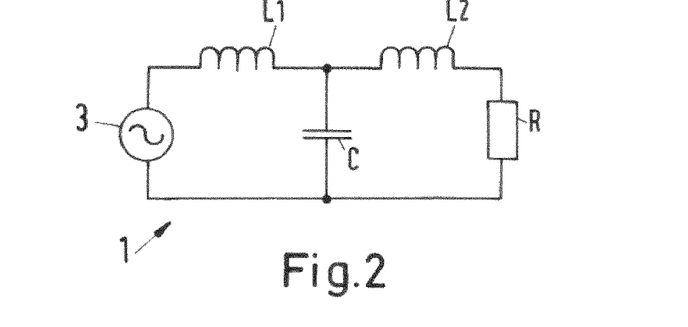

FIG. 2 shows a schematic circuit diagram of an antenna arrangement 1 according to a first embodiment of the invention. The antenna arrangement 1 comprises a voltage source 3, a first inductive antenna element L1, a second inductive antenna element L2, a capacitive element C and a resistive element R. The first inductive antenna element L1 is arranged in a first circuit section, which is connected in series to a second or further circuit section of a driving circuit comprising the first and the further circuit section. The further circuit section comprises a parallel connection of a first subsection comprising the capacitive element C and a second subsection comprising a series connection of the second inductive antenna element L2 and the resistive element R. The first and the further subsection of the further circuit section are connected in parallel.

The voltage source 3 is a voltage source 3 for generating an AC voltage, in particular a periodic or harmonic voltage. The voltage, i.e. the driving voltage, applied to the driving circuit falls across the series connection of the first and the further circuit section.

Figure 3:
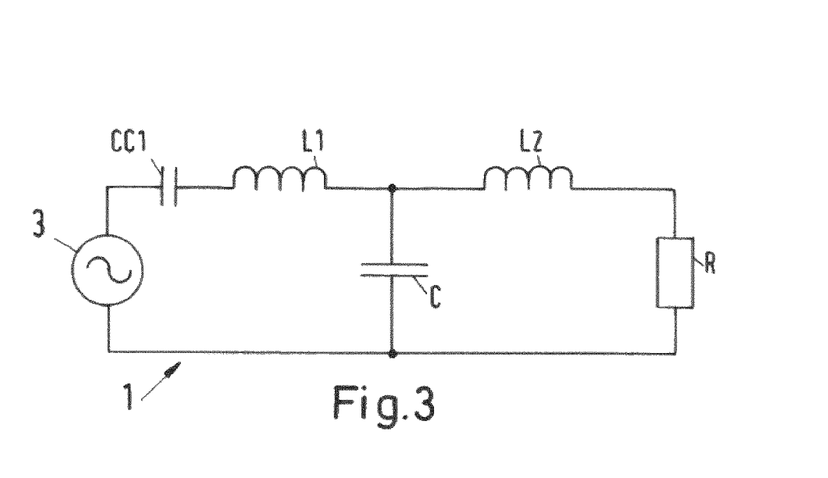

FIG. 3 shows a schematic circuit diagram of an antenna arrangement 1 according to a second embodiment of the invention. In contrast to the embodiment shown in FIG. 2, the antenna arrangement 1 shown in FIG. 3 comprises an additional compensating capacitive element CC1, in particular a compensating capacitor. The compensating capacitive element CC1 is electrically arranged in the first circuit section, wherein the first circuit section comprises a series connection of the first compensating capacitive element CC1 and the first inductive antenna element L1.

Figure 4:
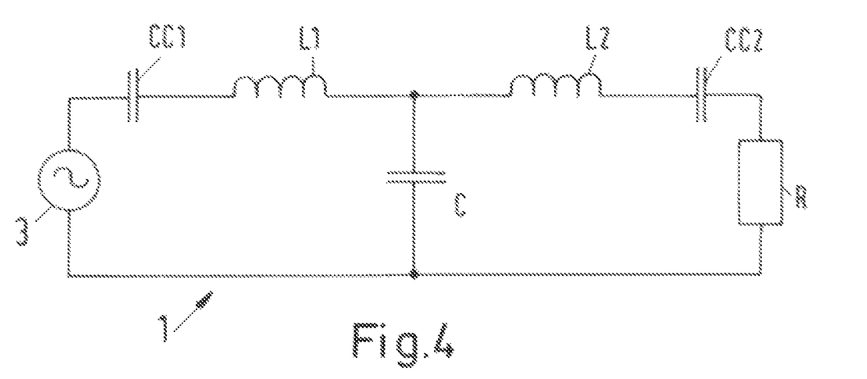

FIG. 4 shows a schematic circuit diagram of an antenna arrangement 1 according to a third embodiment of the invention. In contrast to the embodiment shown in FIG. 3, the antenna arrangement 1 comprises a second additional compensating capacitive element CC2, in particular a compensating capacitor. The second compensating capacitive element CC2 is electrically arranged in the further subsection of the further circuit section in this case, the further subsection can comprise a series connection of the second inductive antenna element L2, the second additional compensating capacitive element CC2 and the resistive element R.

Figure 5:
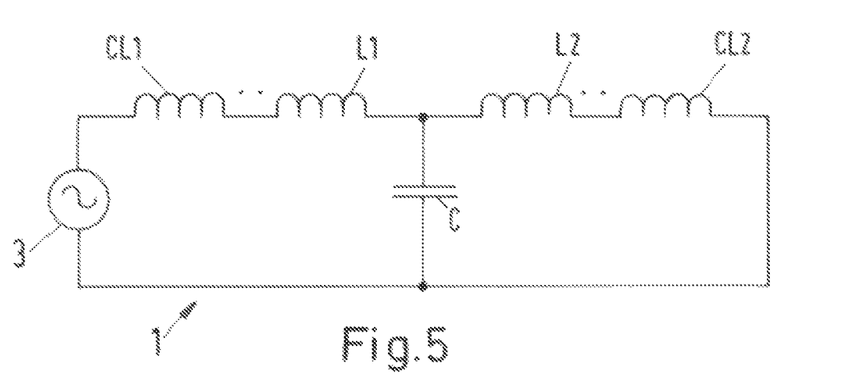

FIG. 5 shows a schematic circuit diagram of an antenna arrangement 1 according to a fourth embodiment of the invention. In contrast to the embodiment in FIG. 2 the circuit arrangement comprises no additional resistive element R. In particular, a resistance of the further subsection of the further circuit section is provided by an internal or implicit resistance of the second inductive antenna element L2.

In further contrast to the embodiment shown in FIG. 2, the antenna arrangement 1 comprises a first compensating inductive element CCL1 and a second compensating inductive element CCL2. The first compensating inductive element CCL1 is arranged in the first circuit section and connected in series to the first inductive antenna element L1. The second compensating inductive element CCL2 is arranged in the further subsection of the further circuit section and connected in series to the second inductive antenna element L2.

The dots shown in FIG. 5 indicate that two compensating inductive elements CCL1, CCL2 are configured and/or arranged such that a voltage induced in the first compensating inductive element CCL1 by an external electromagnetic field, in particular the electromagnetic field for inductive power transfer, is counter-oriented with respect to a voltage induced in the second compensating inductive element CCL2 by said electromagnetic field but has same absolute value. Counter-orientation can in particular mean that the voltage induced in the first compensating inductive element CCL1 is oriented from the terminal of the first circuit section which is connected to the voltage source 3 towards the terminal of the first circuit section which is connected to the further circuit section, wherein the voltage induced in the second compensating inductive element CCL2 is oriented from the terminal of the further circuit section connected to the voltage source 3 towards the terminal of the further circuit section which is connected to the first circuit section.

In the embodiments shown in FIG. 2, FIG. 3, FIG. 4 and FIG. 5, the inductive elements CCL1, CCL2, L1, L2, the capacitive elements CC1, CC2, C and the resistive element R can be chosen or selected such that an absolute value of a reactance of the first circuit section is equal to a reactance of the first sub circuit of the further circuit section and equal to reactance of the further sub section of the further circuit section.

Further, these elements can be selected such that a resonant frequency of the driving circuit corresponds to a predetermined frequency of the driving voltage.

If the voltage source 3 generates said driving voltage, the inductive antenna elements L1, L2 will generate positioning signals provided by electromagnetic positioning fields. These positioning signals will be generated such that an elliptical, in particular circular, two-dimensional electromagnetic field will be generated by the shown antenna arrangement 1. In particular, the proposed antenna arrangement 1 shown in FIG. 2, FIG. 3, FIG. 4 and FIG. 5 will provide a current flow within the inductive antenna elements L1, L2 in which the current flowing through the first inductive element L1 has a phase shift of 90° flowing to the second inductive antenna element L2.

The positioning signals generated by the inductive antenna elements L1, L2 can be received by a receiving antenna arrangement which can comprise at least one, preferable two or more than two receiving antenna elements. The receiving antenna arrangement can further comprise an evaluation unit, in particular provided by or comprising a microcontroller, which allows to determine a relative position and/or orientation between the antenna arrangement 1 for generating positioning signals and the said receiving antenna arrangement. In particular, the evaluation unit can determine a signal characteristic of a voltage induced in the receiving antenna arrangement if the positioning signals are received.

Figure 6:
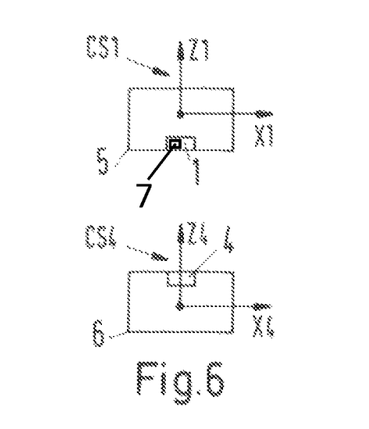

It is for instance possible to provide a receiving antenna arrangement with the same circuit arrangement as the proposed antenna arrangement 1 for generating positioning signals. P FIG. 6 shows a schematic block diagram of an antenna arrangement 1 according to the invention and a receiving antenna arrangement 4. Further shown is an evaluation unit 7, here part of the receiving antenna arrangement 4, and a coordinate system CS1 comprising a longitudinal axis x1 and a vertical axis z1 and a further lateral axis (not shown) which is fixed in position and/or orientation with respect to the antenna arrangement 1. Further shown is a further coordinate system CS4 comprising a longitudinal axis x4 and a vertical axis z4 and a lateral axis (not shown) which is fixed in position and/or orientation with respect to the receiving antenna arrangement 4. A relative position and/or orientation between the antenna arrangement 1 and the receiving antenna arrangement 4, for example, as determined by the evaluation unit 7 as discussed above, can correspond to a relative position and/or orientation between the coordinate systems CS1, CS4. It is further possible to determine said relative position and/or orientation and in one of these coordinate systems CS1, CS4.

It is further shown that the antenna arrangement 1 for generating positioning signals can be part of a unit 5, in particular a primary or secondary unit of a system for inductive power transfer. This unit can comprise a winding structure for generating or receiving an electromagnetic field for inductive power transfer. Further, the unit 5 can be installed on or under a route, in particular for vehicles. Alternatively the unit 5 can be arranged at or in a vehicle, in particular a bottom side of a vehicle. Further shown is that the receiving antenna arrangement 4 can be also part of a unit 6, in particular a further of the system for inductive power transfer, in particular a secondary or a primary unit.

The invention claimed is:

1. A positioning-signal-generating antenna arrangement for use with a receiving antenna arrangement and an evaluation unit in operative communication with the receiving antenna arrangement, wherein the evaluation unit determines a relative position between the position-signal-generating antenna arrangement and the receiving antenna arrangement based on positioning signals that the positioning-signal-generating antenna arrangement generates during use so as to have position-determining characteristics that the evaluation unit uses in determining the relative position, the positioning-signal-generating antenna arrangement comprising: a voltage source, a first inductive antenna element, a second inductive antenna element and at least one capacitive element, wherein the voltage source is electrically connected in parallel to a series connection of a first circuit section comprising at least the first inductive antenna element and a further circuit section comprising a parallel connection of a first subsection of the further circuit section comprising the at least one capacitive element and a further subsection of the further circuit section comprising at least the second inductive antenna element; wherein the first inductive antenna element and the second inductive antenna element are configured and arranged to generate corresponding ones of the positioning signals, wherein, when an AC voltage with predetermined characteristics provided by the voltage source is applied, the positioning signals have the position-determining characteristics, and, wherein, during operation of the positioning-signal-generating antenna arrangement, the positioning-signal-generating antenna arrangement generates either a circular electromagnetic field or an elliptical electromagnetic field.

2. The positioning-signal-generating antenna arrangement according to claim 1, characterized in that a reactance of the first circuit section is equal to the reactance of the first subsection of the further circuit section and/or equal to the reactance of the further subsection of the further circuit section.

3. The positioning-signal-generating antenna arrangement according to claim 1, characterized in that the positioning-signal-generating antenna arrangement comprises at least one resistive element, wherein the further subsection comprises a series connection of at least the second inductive antenna element and the at least one resistive element.

4. The positioning-signal-generating antenna arrangement according to claim 1, characterized in that the positioning-signal-generating antenna arrangement comprises at least one additional compensating capacitive element.

5. The positioning-signal-generating antenna arrangement according to claim 4, characterized in that the first circuit section comprises a series connection of a compensating capacitive element and the first inductive antenna element and/or that the further subsection comprises a series connection of a compensating capacitive element and the second inductive antenna element.

6. The positioning-signal-generating antenna arrangement according to claim 1, characterized in that the positioning-signal-generating antenna arrangement comprises at least one additional compensating inductive element.

7. The positioning-signal-generating antenna arrangement according to claim 6 characterized in that the first circuit section comprises a series connection of a compensating inductive element and the first inductive antenna element and/or that the further subsection comprises a series connection of a compensating inductive element and the second inductive antenna element.

8. The positioning-signal-generating antenna arrangement according to claim 6, characterized in that the positioning-signal-generating antenna arrangement comprises at least two compensating inductive elements, wherein the at least two compensating inductive elements are provided by coils, wherein the coils are inversely wound.

9. The positioning-signal-generating antenna arrangement according to claim 1, characterized in that the positioning-signal-generating antenna arrangement comprises at least one magnetically conductive element, wherein at least one inductive antenna element is wound around at least one section of the magnetically conductive element.

10. The positioning-signal-generating antenna arrangement according to claim 9, characterized in that either:
the first and the second inductive antenna element are wound around differing sections of the magnetically conductive element; or
the positioning-signal-generating antenna arrangement comprises a first magnetically conductive element and a further magnetically conductive element, wherein the first inductive antenna element is wound around the first magnetically conductive element and the second inductive antenna element is wound around the further magnetically conductive element.

11. The positioning-signal-generating antenna arrangement according to claim 9, characterized in that the magnetically conductive element is a magnetically conductive element of a secondary unit of a system for inductive power transfer.

12. The positioning-signal-generating antenna arrangement according to claim 1, characterized in that a central axis of the first inductive antenna element and a central axis of the second inductive antenna element are not oriented parallel.

13. The positioning-signal-generating antenna arrangement according to claim 1, wherein, during operation, the voltage source generates an alternating current voltage.

14. The positioning-signal-generating antenna arrangement according to claim 13, characterized in that a frequency of the alternating current voltage is equal to a resonant frequency of the series connection of the first circuit section and the further circuit section.

15. The positioning-signal-generating antenna arrangement according to claim 1, wherein, during operation of the positioning-signal-generating antenna arrangement, the positioning-signal-generating antenna arrangement generates the positioning signals with a predetermined phase shift as between a first current that flows through the first inductive antenna element during use and a second current that flows through the second inductive antenna element during use.

16. A system comprising both of the positioning-signal-generating antenna arrangement and the evaluation unit of claim 1.

17. An antenna arrangement, comprising:
a voltage source;
a first inductive antenna element;
a second inductive antenna element; and
at least one capacitive element;
wherein:
the voltage source is electrically connected in parallel to a series connection of a first circuit section comprising at least the first inductive antenna element and a further circuit section comprising a parallel connection of a first subsection of the further circuit section comprising the at least one capacitive element and a further subsection of the further circuit section comprising at least the second inductive antenna element;

the first inductive antenna element and the second inductive antenna element are configured and arranged to generate positioning signals; and during operation of the inductive antenna arrangement, the inductive antenna arrangement generates either a circular electromagnetic field or an elliptical electromagnetic field.

18. The positioning-signal-generating antenna arrangement according to claim 1, wherein the position-determining characteristics of the positioning signals comprise spectral powers of the positioning signals.

\* \* \* \* \*